United States Patent
Gandham et al.

(10) Patent No.: US 8,532,106 B2
(45) Date of Patent: Sep. 10, 2013

(54) HEADER COMPRESSION MECHANISM FOR TRANSMITTING RTP PACKETS OVER WIRELESS LINKS

(75) Inventors: Shashidhar R. Gandham, Sunrise, FL (US); Karthikeya V. Muppalla, Sunrise, FL (US)

(73) Assignee: XG Technology, Inc., Sarasota, FL (US)

( * ) Notice: Subject to any disclaimer, the term of this patent is extended or adjusted under 35 U.S.C. 154(b) by 114 days.

(21) Appl. No.: 12/386,648

(22) Filed: Apr. 21, 2009

(65) Prior Publication Data

US 2009/0268667 A1 Oct. 29, 2009

Related U.S. Application Data

(60) Provisional application No. 61/125,696, filed on Apr. 28, 2008.

(51) Int. Cl.
*H04L 12/54* (2013.01)

(52) U.S. Cl.
USPC .............................. 370/392; 370/477; 709/247

(58) Field of Classification Search
None
See application file for complete search history.

(56) References Cited

U.S. PATENT DOCUMENTS

| | | | |
|---|---|---|---|
| 6,542,931 B1 * | 4/2003 | Le et al. | 709/228 |
| 6,594,280 B1 * | 7/2003 | Chapman | 370/469 |
| 6,608,841 B1 * | 8/2003 | Koodli | 370/474 |
| 6,754,231 B1 * | 6/2004 | Jonsson et al. | 370/474 |
| 7,061,936 B2 * | 6/2006 | Yoshimura et al. | 370/474 |
| 7,328,283 B2 * | 2/2008 | Tan et al. | 709/247 |
| 7,430,617 B2 * | 9/2008 | Walsh et al. | 709/247 |
| 7,817,628 B2 * | 10/2010 | Pelletier et al. | 370/389 |
| 2002/0059464 A1 * | 5/2002 | Hata et al. | 709/247 |
| 2002/0097701 A1 * | 7/2002 | Lupien et al. | 370/338 |
| 2002/0196785 A1 * | 12/2002 | Connor | 370/392 |
| 2003/0009663 A1 * | 1/2003 | Pelletier et al. | 713/160 |
| 2003/0182454 A1 * | 9/2003 | Huth et al. | 709/247 |
| 2004/0022252 A1 * | 2/2004 | Jang et al. | 370/395.52 |
| 2005/0226227 A1 * | 10/2005 | Kim et al. | 370/352 |
| 2006/0262788 A1 * | 11/2006 | Johnson et al. | 370/389 |
| 2009/0046639 A1 * | 2/2009 | Cai et al. | 370/329 |

* cited by examiner

*Primary Examiner* — Brian Roberts
(74) *Attorney, Agent, or Firm* — Dennis L. Cook, Esq.

(57) ABSTRACT

A header compression method for a MAC protocol that combines contention-free and contention-based MAC protocols into a heterogeneous MAC protocol used for forwarding VoIP traffic in VoIP systems on wireless networks using multiple base stations that reduces packet overhead thus allowing for transmission of high bit-rate data to multiple users over wired and wireless means.

1 Claim, 10 Drawing Sheets

| CRTP | wRTP |
|---|---|
| Context ID ( 8 bits or 16 bits) is used | No context ID is used here. Time Slots are used to identify the handsets and the RTP sessions associated with them. |
| UDP checksum (optional ) | No UDP checksum |
| Full Header size is 40 bytes | State Info size is 18 bytes 5 bits |
| Full Header is sent whenever first order difference changes | State Info is sent initially at the beginning of the session, from then on it is sent only when either RTP sequence number or RTP timestamp wraps around or both. |
| Need to communicate all the info ( IP/UDP/RTP header fields ) at least once | Some fields in the IP/UDP/RTP header need not to be communicated at all. As the header compression is implemented in a closed xMAX network between the base station and handset, the properties of the network makes this possible. |
| The decompressor uses context state packet to inform the sender (compressor) that the context has corrupted. | Context State packet is not used to inform that the context has corrupted. ACK mechanisms are used. ACK is used only for StateInfo packet. |
| Compressed RTP packet size is minimum 2 bytes. The size of compressed RTP header may increase if either RTP sequence number, RTP timestamp, IPv4 identification field, etc changes. | Compressed RTP header size is always fixed to 25 bits. |
| Bit error can corrupt the context | CRC is used to reduce the chances of corrupting the context. |
| Context state packet requires to carry the context information | ACK's are used for State Info packets, which needs to carry always only 2 bytes of information. |

Figure 1

| 4 | 8 | 16 | | | 32 bits |
|---|---|---|---|---|---|
| Ver. | IHL | Type of service | Total length | | |
| Identification | | | Flags | Fragment offset | |
| Time to live | | Protocol | Header checksum | | |
| Source address | | | | | |
| Destination address | | | | | |
| Option + Padding | | | | | |
| Data | | | | | |

Figure 2A

| Header Field | Bits | Description | Category |
|---|---|---|---|
| Version | 4 | Present system supports only IPv4, this field is always fixed. | NTC |
| IP Header Length | 4 | If there are no option fields in the IP header, the IP header length is fixed to 20 bytes. | NTC |
| Type of Service (TOS) | 8 | Usually set to 0, but may indicate particular Quality of Service needs from the network. Presently, this is not used in xMAX Network | NTC |
| Total Length | 16 | Combined length of the header and the data. This can be calculated from the length field present in the xMAC Header. | NTC |
| Identification | 16 | This field is used only if there is fragmentation at the source. RTP voice packets are not fragmented. So this field is not used and would be set to zero. | NTC |
| Flags | 3 | As fragmentation is not done for the RTP packets at the IP layer, the Flags field shall not be used and would remain constant. So this field is not used and would be set to zero. | NTC |
| Fragment Offset | 13 | Fragmentation is done at the MAC Layer; fragmentation for RTP voice packets is not done at the IP layer here. So this field is not used and would be set to zero. | NTC |
| TTL | 8 | The Base station will generate its own TTL value and insert it into the packet received from the handset and forward the packet. The handset also does the same thing. It receives the packet from the base station and puts its own TTL value and deliver to the upper layer. Moreover, the handset need not forward the packet it receives from the base station to anyone, as it is the end node in the network. As long as the TTL value is greater than 1, the handset will deliver the packet to the upper layer.<br><br>On a conservative approach, a default value of 245 is suggested based on the normal value used in the internet. | NTC |
| Protocol | 8 | As compression is done only for RTP voice packets, we know that RTP always uses UDP as its transport layer protocol and thus the upper layer protocol field in IP header is always UDP. | NTC |
| IP Header checksum | 16 | The header checksum field can be calculated at the receiving end. In the experiments carried out it was determined that the operation requires about 1250 nano seconds to calculate the IP header checksum. As this overhead is acceptable, the header checksum need not be transmitted. | NTC |
| Source IP Address | 32 | For the RTP packets originating at the handset, the source IP address is that of the handset. Also,<br><br>i) The handset knows it's own IP address<br>ii) The Base station knows the IP address of the handset by using the timeslot in which it receives | |

Figure 2B

| Header Field | Bits | Description | Category |
|---|---|---|---|
| | | the RTP packet from handset.<br><br>Thus, for the RTP packets originating at the handset, the compressor at handset treats this field as "Never transmitted category".<br><br>For the RTP packets coming from RTP source(possibly SIP Proxy) in internet via base station to handset , the source IP address will be that of the SIP Proxy ( in most cases) or the IP address mentioned in the SIP messaging ,which is exchanged before the RTP traffic starts.<br><br>The compressor at the base station should send this source IP address of the RTP packets to the decompressor at the handset.<br><br>This is communicated by the base station to the handset under 2 conditions:<br><br>i) Initially when the base station receives the first RTP packet in that session from the SIP proxy.<br>ii) When there is a change in the source IP of the RTP originator ( change of source IP is possible if a hand-off occurs to a different dealers network during a voice call or because of a SIP RE-INVITE which might negotiate with a new source IP address ) for the packets going from base station to handset.<br><br>*Here, the SIP proxy IP address as the source IP address for the packets destined to the handset.*<br><br>Thus, for the RTP packets that the handset is receiving, the compressor at Base station treats this field as "Periodically transmitted category". | NTC (for compressor at handset)<br><br><br><br>PTC ( for compressor at Base station) |
| Destination IP Address | 32 | When the Base Station transmits an IP Packet to the handset, this field would contain the handset's IP Address. As explained above, it is not necessary to transmit this field since, the base station knows the handset based on the Time Slot and the handset knows its own IP address.<br><br>When the handset transmits a packet to the Base Station, this field would contain the IP address negotiated in the SIP messaging before the RTP traffic starts (normally this is the SIP proxy's IP Address). The SIP Proxy resides within the xMSC and shall have a Public and Private IP Address. Using a proprietary mechanism, the handset (and Base Station) will learn both the private and public IP Addresses.<br><br>This design proposes that when the handset is within the | NTC (for compressor at Base station) |

Figure 2C

| Header Field | Bits | Description | Category |
|---|---|---|---|
| | | Home dealer's network, the private IP address shall be used while when roaming in another dealer's network, the handset shall use the public IP address. This way we eliminate the need for DNS queries and also ensure that we need to transmit this address only once. The same shall be the case during Handoff.<br><br>*Here, the SIP proxy IP address as the Destination IP address for the packets originating at the handset.*<br><br>Also, a SIP RE-INVITE to the handset from the RTP source generator (possibly SIP Proxy) might result in changing the IP address to which the handset should send RTP packets.<br><br>Hence, the compressor at the handset treats this field as " Periodically transmitted category". | PTC (for compressor At Handset) |
| Options and padding | X | The assumption is that this field shall not be used. Even if an RTP packet with IP options header fields is present, the IP options are removed and the packet is still compressed at the transmitting end.<br><br>If the Base station receives RTP packet from internet that contains IP options in the IP header, the IP options are stripped off from the IP header and the packet is delivered to the handset without the IP options. The IP header length and IP packet length fields in the IP header are updated correspondingly to reflect the changes in the IP header.<br><br>The same thing is done for the RTP packets generated from the handset, if they contain IP options filed in the IP header. | NTC |

Figure 3

| 16 | 32 bits |
|---|---|
| Source port | Destination port |
| Length | Checksum |
| Data ||

| Header Field | Bits | Description | Category |
|---|---|---|---|
| Source Port | 16 | The port number of the sender. This is chosen by the application and cannot be determined in advance. This field has to be transmitted with the first RTP packet. However, once the RTP session starts, the port remains constant usually. If this field changes (Ex: SIP proxy might be changed when a hand-off occurs to a different dealer's network), this is transmitted by the compressor at the Base station/handset to decompressor at handset/Base station. | PTC |
| Destination Port | 16 | The port the packet is addressed to. This again cannot be determined in advance. This field has to be transmitted with the first RTP packet. However, once the RTP session starts, the port remains constant. If this field changes (Ex: SIP proxy might be changed when a hand-off occurs to a different dealer's network), this is transmitted by the compressor at the Base station/handset to decompressor at handset/Base station. | PTC |
| Length | 16 | This length can be calculated from length field present in the xMAC Header. | NTC |
| Checksum | | UDP Checksum has to be sent with every packet as the payload is also considered in the checksum calculation.<br><br>The UDP checksum is an optional field. An all zero transmitted checksum value means that the transmitter generated no checksum (for debugging or for higher level protocols that don't care) [5].<br><br>Most speech codecs developed for cellular links tolerate errors in the encoded data. Such codecs will not want to enable the UDP Checksum, since they do want damaged packets to be delivered. Errors in the payload will make the UDP Checksum fail when the guess is correct (and might make it succeed when the guess is wrong) [3]. | NTC |

| 0 | 1 | 2 | 3 | 4 | | 7 | 8 | 9 | | 15 | | 31 |
|---|---|---|---|---|---|---|---|---|---|----|---|----|
| Ver | P | X | CC | | | | M | PT | | | Sequence Number | |
| Timestamp ||||||||||||||
| SSRC ||||||||||||||
| CSRC [0..15] ::: ||||||||||||||
| Data ||||||||||||||

Figure 6

| Header Field | Bits | Description | Category |
|---|---|---|---|
| RTP Version | 2 | Always fixed to version 2. | NTC |
| RTP Padding bit | 1 | This bit is carried with every uncompressed Header. If set, this packet contains one or more additional padding bytes at the end which are not part of the payload. The last byte of the padding contains a count of how many padding bytes should be ignored. Padding may be needed by some encryption algorithms with fixed block sizes or for carrying several RTP packets in a lower-layer protocol data unit [6].<br><br>If RTP padding is used, this is likely to be present in all the packets for that RTP session. | PTC |
| Extension | 1 | If RTP extensions are used by the application, these extensions are likely to be present in all the packets for that RTP session. But the use of this is very uncommon. However, in xMAX network, extensions are not used. Hence, we ignore this bit. | NTC |
| CC | 4 | CSRC count (CC) contains the number of CSRC identifiers that follow the fixed header. | NTC |
| RTP Marker bit | 1 | The interpretation of the marker is defined by a profile. It is intended to allow significant events such as frame boundaries to be marked in the packet stream. A profile may define additional marker bits or specify that there is no marker bit by changing the number of bits in the payload type field [6]. This bit is carried with every compressed Header. | ATC |
| Payload Type | 7 | This is fixed at G.723 for xMAX Network | NTC |
| RTP Sequence number | 16 | The initial value of the RTP sequence number is taken from the $1^{st}$ RTP packet generated and it is transmitted for the first time. Also, when there is a wrap-around of this field in the RTP session, this field is transmitted by the compressor at the transmitting end to the decompressor at the receiving end. | PTC |
| RTP Timestamp | 32 | The initial value of the time stamp is taken from the $1^{st}$ RTP packet generated and it is transmitted for the first time. Also, when there is a wrap-around of this field in the RTP session, this field is transmitted by the compressor at the transmitting end to the decompressor at the receiving end. | PTC |
| SSRC | 32 | The initial value of the SSRC is taken from the $1^{st}$ RTP packet generated and it is transmitted for the first time. SSRC usually remains constant through out the RTP session. | PTC |
| CSRC | | CSRC is an array of 0 to 15 elements identifying the contributing sources for the payload contained in RTP packet. | NTC |

Figure 7

| xMAC Header format ||||||
|---|---|---|---|---|
| 4 bits | 4 bits | 8 bits | 9 bits | 7 bits |
| Version | Packet Type | Fragmentation Header | Reserved | Length in Bytes |

Figure 8

| Control Message Format ||||
|---|---|---|---|
| 48 bits | 4 bits | 4 bits | 8 bits |
| Node address | Reserved | Message Type | Length |

Figure 9

| Modified xMAC header format -4 bytes - (sent with StateInfo packet) ||||||
|---|---|---|---|---|---|
| 4 bits | 4 bits | 8 bits | 8 bits | 1 bit | 7 bits |
| Version | Packet Type | Not used | CRC | RTP padding | Length in Bytes |

Figure 10

| Modified Control Message format – 8 bytes - ( sent with StateInfo Packet) ||||||
|---|---|---|---|---|---|
| 16 bits | 16 bits | 16 bits | 4 bits | 4 bits | 8 bits |
| UDP Source port | UDP Destination port | RTP Sequence Number | Reserved | Message Type = 6 (for StateInfo) | Length |

Figure 11

| StateInfo – 12 bytes | | |
|---|---|---|
| 32 bits | 32 bits | 32 bits |
| IP address[1] | RTP Time Stamp | RTP SSRC |

Figure 12

| Modified xMAC header format -4 bytes - (sent with ACKStateInfo packet) | | | | | |
|---|---|---|---|---|---|
| 4 bits | 4 bits | 8 bits | 8 bits | 1 bit | 7 bits |
| Version | Packet Type | Not used | CRC | Not used | Length in Bytes |

Figure 13

| Modified Control Message ( ACK StateInfo) format – 8 bytes | | | | |
|---|---|---|---|---|
| 32 bits | 16 bits | 4 bits | 4 bits | 8 bits |
| Not Used | ACK Information (RTP Sequence Number present in the StateInfo packet received) | Reserved | Message Type = 7 (for ACKStateInfo) | Length |

Figure 14

| Modified xMAC header format - 8 bytes - (sent with compressedRTP packet) | | | | | |
|---|---|---|---|---|---|
| 4 bits | 4 bits | 8 bits | 8 bits | 1 bit | 7 bits |
| Version | Packet Type = compressedRTP | 8 L. S. bits of LSB encoded RTP sequence Number | CRC | RTP Marker | Length in Bytes |

Figure 15

| CompressedRTP – 22 bytes | | |
|---|---|---|
| 4 bits | 12 bits | 20 bytes |
| 4 M.S. bits of LSB encoded RTP sequence Number | LSB encoded scaled RTP Time stamp | Voice payload (using G.723.1(a) : 5.3 kbps) |

Figure 16

| CRTP | wRTP |
|---|---|
| Context ID ( 8 bits or 16 bits) is used | No context ID is used here. Time Slots are used to identify the handsets and the RTP sessions associated with them. |
| UDP checksum (optional ) | No UDP checksum |
| Full Header size is 40 bytes | State Info size is 18 bytes 5 bits |
| Full Header is sent whenever first order difference changes | State Info is sent initially at the beginning of the session, from then on it is sent only when either RTP sequence number or RTP timestamp wraps around or both. |
| Need to communicate all the info ( IP/UDP/RTP header fields ) at least once | Some fields in the IP/UDP/RTP header need not to be communicated at all. As the header compression is implemented in a closed xMAX network between the base station and handset, the properties of the network makes this possible. |
| The decompressor uses context state packet to inform the sender (compressor) that the context has corrupted. | Context State packet is not used to inform that the context has corrupted. ACK mechanisms are used. ACK is used only for StateInfo packet. |
| Compressed RTP packet size is minimum 2 bytes. The size of compressed RTP header may increase if either RTP sequence number, RTP timestamp, IPv4 identification field, etc changes. | Compressed RTP header size is always fixed to 25 bits. |
| Bit error can corrupt the context | CRC is used to reduce the chances of corrupting the context. |
| Context state packet requires to carry the context information | ACK's are used for State Info packets, which needs to carry always only 2 bytes of information. |

HEADER COMPRESSION MECHANISM FOR TRANSMITTING RTP PACKETS OVER WIRELESS LINKS

CROSS-REFERENCE TO RELATED APPLICATION

The present application claims the benefit of previously filed co-pending Provisional Patent Application Ser. No. 61/125,696.

FIELD OF THE INVENTION

This invention addresses the need to transport high bit-rate data and voice to multiple users over wired and wireless means. Specifically, this disclosure describes a header compression method for a MAC protocol that combines contention-free and contention-based MAC protocols for use in wired or wireless VoIP systems.

BACKGROUND OF THE INVENTION

The invention disclosed in this application uses any integer cycle or impulse type modulation and more particularly is designed to work with a method of modulation named Tri-State Integer Cycle Modulation (TICM) which has been previously disclosed in U.S. Pat. No. 7,003,047 issued Feb. 21, 2006 and is now known by its commercial designation, xMax. This new wireless physical layer technology developed by xG Technology Inc., referred to as xMAX, enables extremely low power omni-directional transmissions to be received in a wide area. Using xMAX, significant bandwidth can be made available for supporting various wireless applications. Voice Over IP (VoIP) based cellular services are now being developed using xMAX. In xMAX-based cellular networks both the base station and the handsets will be equipped with an xMAX transceiver. A mobile device (xMAX handset) in such a network will be free to move in an area covered by multiple xMAX base stations. Although this header compression method for transmitting RTP packets over wireless links is disclosed in the preferred embodiment as being used in these types of integer cycle and pulse modulation systems it can be implemented on any broad band wireless technologies like WiMax, WiBro, WiFi, 3GPP and HSDPA, or any other type of wired or wireless voice or data systems.

A heterogeneous MAC protocol proposed to support VoIP traffic in xMAX wireless networks was described in the pending patent application by one of the inventors of this application, "Heterogeneous MAC Protocol For Forwarding VoIP Traffic On Wireless Networks", U.S. Ser. No. 12/069,057, the contents of which are included herein. In that application guaranteed timeslots are assigned to forward VoIP packets, temporary timeslots are assigned to forward data packets and contention based access is used to exchange control messages. There is also a need to deploy multiple base stations such that coverage areas of adjacent base stations overlap. Hence, in the patent applications "Heterogeneous MAC Protocol for Multiple Base Stations in Wireless Networks", U.S. Ser. No. 12/380,698 and "Improved Heterogeneous MAC Protocol for Multiple Base Stations in Wireless Networks" U.S. Ser. No. 61/123,888 by the some of the inventors of this application the MAC protocol was modified to support multiple base stations. This disclosure describes a header compression method for a MAC protocol that combines contention-free and contention-based MAC protocols for use in wired or wireless VoIP systems using single or multiple base stations that reduces packet overhead.

BRIEF SUMMARY OF THE INVENTION

The invention disclosed in this application was developed for and is described in the preferred embodiment as being used in any integer cycle or impulse type modulation and more particularly a method of modulation known by its commercial designation, xMax, but can be implemented on WiMax, WiBro, WiFi, 3GPP and HSDPA, or any other type of wired or wireless VoIP systems This disclosure describes a header compression method for a MAC protocol that combines contention-free and contention-based MAC protocols for use in wired or wireless VoIP systems that reduces packet overhead.

DESCRIPTION OF THE DRAWINGS

For a fuller understanding of the nature and objects of the invention, reference should be made to the accompanying drawings, in which:

FIG. 1 is an IP Header;
FIG. 2 is a table describing the IP Header of FIG. 1;
FIG. 3 is an UDP Header;
FIG. 4 is a table describing the UDP Header of FIG. 3;
FIG. 5 is an RTP Header;
FIG. 6 is a table describing the RTP Header of FIG. 5;
FIG. 7 is a table describing the Header Format;
FIG. 8 is a table describing the Control Message Format;
FIG. 9 is a table describing the Modified Header Format for StateInfo;
FIG. 10 is a table describing the Modified Control Message Format for StateInfo;
FIG. 11 is a table describing the StateInfo Format;
FIG. 12 is a table describing the Modified Header Format for ACK;
FIG. 13 is a table describing the Modified Control Message Format for ACK;
FIG. 14 is a table describing the Modified Header Format for CompressedRTP packet;
FIG. 15 is a table describing the CompressedRTP Format; and,
FIG. 16 is a table comparing cRTP and the preferred embodiment of this disclosure.

DETAILED DESCRIPTION OF THE INVENTION

Although the header compression method disclosed herein can be used in all wireless and wired VoIP networks the preferred embodiment is described below in the context of the new wireless physical layer technology developed by xG Technology Inc., referred to as xMAX, which enables extremely low power omni-directional transmissions to be received in a wide area. Using xMAX, significant bandwidth can be made available for supporting various wireless applications. Voice Over IP (VoIP) based cellular services are now being developed using xMAX. In xMAX-based cellular networks both the base station and the handsets will be equipped with an xMAX transceiver. A mobile device (xMAX handset) in such a network will be free to move in an area covered by multiple xMAX base stations.

In the preferred embodiment VoIP-based cellular network xMAX handsets (or mobile nodes) are equipped with the complete VoIP stack. The xMAX base station is connected to the Internet through an Ethernet port. The mobile nodes communicate with the xMAX base station to reach a VoIP gateway. To enable communication between an xMAX handset and multiple xMAX base stations one needs a MAC (Medium Access Control) protocol that is optimized for VoIP traffic and has reduced overhead.

In VoIP each packet carrying voice data is appended with IP, UDP and RTP headers. Typically these headers are 40 bytes long. In most instances, the amount of voice data carried in each IP packet is significantly less. For example, using G.723.1 codec with a 30 ms packetization interval at 5.3 Kbps, the voice data carried in each packet is 20 bytes. In this scenario, the overhead due to IP+UDP+RTP headers is 200%. In any network, such high overhead is not justified. In the xMAX wireless networks wherein the goal is to support a large number of VoIP based cellular calls, an overhead of 200% is not acceptable. Hence, there is a need for effective solutions to reduce the overhead.

A naive approach might involve increasing the packetization interval. In doing so, one increases the amount of voice payload carried by each packet. However, in spite of increasing the voice packetization interval, the overhead is still considerably high. For example, a 90 ms packetization interval with G.723.1(a) results in 60 bytes of voice payload. The resulting overhead is 66.66%. Also, with a 90 ms packetization interval the codec latency increases and the one way latency increases to 90 ms, but at the same time there is also a total latency bound of 150 ms. Thus, increasing the packetization interval has an adverse effect on the quality of the voice.

Alternatively, one can employ header compression schemes wherein the length of header added to each packet is reduced significantly. The main idea behind a header compression method is that the fields in the header that do not change in successive packets need not be included in every packet that is forwarded. For example, the source and destination IP address (refer to FIG. 1) fields do not change in packets corresponding to the same session. Similarly, the source and destination port numbers in a UDP header (refer to FIG. 3) do not change in successive packets. If both ends of a link agree on a context ID (say 16 bits long) corresponding to a given session then one can replace the above four fields with a context ID. The transmitting end of the link will remove the IP addresses and port numbers and add the 16-bit context ID to the header.

The receiving end of the link can regenerate original headers based on the context ID before forwarding the IP packet. By this simple header compression approach we reduce the overhead of sending source and destination IP, source and destination port numbers.

In this disclosure we present a header compression/decompression algorithm that is optimized for xMAX wireless networks as the preferred embodiment. Note that the preferred embodiment implements header compression only on the xG wireless links but the header compression algorithm disclosed herein, though proposed in context of wireless networks, can be used in all wireless and wired networks. The main concept behind the header compression is based on the cRTP proposed in RFC 2508. The differences between cRTP and the disclosed header compression algorithm wRTP for xMAX wireless links are tabulated below in FIG. 16.

The disclosed design is formulated on the following premises:

a) Headers are compressed/decompressed on both the handset and the base station.
b) Every packet that is forwarded and received by the base station from the Internet has full headers.
c) Voice packets generated by the handset are not fragmented. One ensures that voice packets are not fragmented on the handset by selecting a reasonable Maximum Transmission Unit (MTU) value on the handset.
d) Header compression is applied only for the packets carrying RTP (voice) payload.
e) Assume that there is a reliable way of classifying IP packets based on the type of payload carried. Then one uses the following criteria to identify an IP packet with a RTP payload:
  i. Port number is even.
  ii. Port number is in the range of 16384-32767 or 49152-65535.
  iii. RTP version field set to 2.
  iv. RTP extension field set to 0.

By reducing the number of fields in the IP/UDP/RTP headers sent with every packet, the overhead associated with every packet can be reduced. The original header can be re-generated at the destination from the received compressed header and the information that is already present at the destination.

The first step in the header compression method is to identify each field in the IP, UDP, and RTP headers and to determine their nature by observing successive packets in an RTP session. Most header compression schemes follow the principle of Order of Difference. They are:

1. First Order Difference—When the difference in the value of a field considered in successive packets is constant (for ex: RTP sequence number always increments by 1 for successive packets in an RTP session), we say the first order difference is constant. The rate of change of those fields is the second order difference, which is zero here.

2. Second Order Difference—When the difference in the value of a field considered in successive packets is linear, there is a second order difference for that field. This kind of fields needs to be transmitted with every packet. (Ex: RTP marker bit). It varies randomly between successive packets in an RTP session.

For the xMAX network we classify the IP/UDP/RTP headers fields into 3 categories from the perspective of transmission on wireless links. The categories are as follows:

1. Never Transmitted Category (NTC)—These fields are always constant and are never transmitted at any point in time. Both the compressor and decompressor are aware of these fields a priori without any communication between them.

2. Periodically Transmitted Category (PTC)—These fields are transmitted initially and they need to be transmitted again only when certain conditions are met. Note that the interpretation of the word periodically is different here in the sense that when a condition (i.e.: a sequence number wrap around for the RTP sequence number field) is met at the compressor, that particular field should be transmitted to the decompressor.

3. Always Transmitted Category (ATC)—These fields change with every successive packet and have to be transmitted in the compressed header with every packet.

Since xMAX is a closed network, it is possible to make some assumptions, which need not be true on other open networks. Some of these assumptions allow one to achieve a greater level of compression in the preferred embodiment than is possible on other networks. The IP header and its fields are shown in FIG. 1. The analysis of each field of the header and their category is described in FIG. 2. From the table of FIG. 2 it is clear that all the fields of the IP Header fall under the "Never Transmitted category" except Source IP address & Destination IP address, which fall under the "Periodically Transmitted category" under certain conditions explained above. All the fields that come under the "Never Transmitted category" in the IP header need not be communicated between the compressor at the transmitting end and decompressor at the receiving end.

The UDP header and its fields are shown in FIG. 3. The analysis of each field of the header and its category is described in FIG. 4. The length and checksum fields in the UDP header fall under the "Never Transmitted Category". The UDP source and destination ports fall under the "Periodically Transmitted category".

The RTP header and its fields are shown in FIG. 5. The analysis of each field of the header and its category is described in FIG. 6. The RTP header contains fields that fall under all the three categories.

The Header Compression algorithm proposed in this preferred embodiment uses 3 different packets. The format of each packet is described below:

1. StateInfo (contains "Periodically Transmitted Category" fields).
2. ACKStateInfo (Acknowledgement packet for StateInfo packet).
3. CompressedRTP (contains "Always Transmitted Category" fields+RTP voice payload).

In the header compression algorithm of the preferred embodiment, all the CompressedRTP packets are decompressed based on the StateInfo packet. Hence, it is obvious that the StateInfo packet should be protected from bit-errors. A wrong StateInfo packet will corrupt the context at the decompressor which results in wrongly decompressing the following CompressedRTP packets. Also, the CompressedRTP packets carry some information that should be protected from bit-errors for correct decompression. The probability of bit errors over any wireless links is quite high. It is always recommended to have error detection/correction mechanism. Hence, the preferred embodiment has an 8-bit CRC checksum in the MAC header for error detection. The CRC checksum is calculated only on the headers and not on the voice payload. Note that all the three packet formats in the header compression use 8-bit CRC in the preferred embodiment MAC header, which is calculated only on the headers including the preferred embodiment MAC header.

All the "Periodically Transmitted Category" fields (UDP source port, UDP destination port, RTP sequence number, RTP time stamp, Destination/Source IP address, SSRC& RTP padding bit) are sent in a StateInfo packet with a control message. A new message type is defined for the control message that carries StateInfo (control message Type=6).

There are some unused fields in the MAC header and control message that can be used to carry some part of the state information as shown in FIGS. 7 and 8 and as follows. The remaining part of the state information can be carried in the StateInfo packet (packet formats are described later in this disclosure).

a) The control message contains a 48-bit field for the node address of the handset. The control message combined with StateInfo is sent in uplink/downlink time slots allotted for the handsets. The Base station uses the timeslot instead of the 48-bit node address to identify the handset which sent the control message+StateInfo packet. Every handset receives the control message+StateInfo in its allotted downlink timeslot so this does not require the 48-bit node address to identify the control message. Hence the 48-bit node address field in the control message is used to carry some part of the state information (UDP source port, UDP destination port and RTP sequence Number).

b) The xMAC header contains 9 bits for reserved use. These bits are used to carry a 1-bit RTP padding bit and an 8-bit CRC checksum calculated over the combined xMAC header, control message and StateInfo packet.

The packet formats of the modified xMAC Header, modified control message, and StateInfo are shown in FIGS. 9, 10, and 11. For the StateInfo packet sent from the compressor at the base station to the decompressor at the handset, the IP address field is the source IP address present in the RTP packet that the base station receives from the SIP Proxy server. If the StateInfo packet is sent from the compressor at the handset to the decompressor at the base station, the IP address field is the destination IP address present in the RTP packet generated by the handset.

The control message+StateInfo packet is sent when the first RTP packet is generated because all the "Transmitted Once category" fields in this packet are known to the compressor only when the first RTP packet is generated. The voice payload is removed and only the state Information is sent in the control message and StateInfo packet. The reasoning and justification for removing the voice payload is explained below:

1. Reason: Since the motivation of the header compression algorithm is to be able to come up with a lower value for MTU size over the air interface, sending complete IP/UDP/RTP header with voice payload will increase the packet size (forces one to use a higher MTU size to accommodate state information and voice payload). Hence, the voice payload is removed to keep the packet size within the MTU limits.

2. Justification: Since RTP data is not expected to be 100% reliable, not delivering the voice payload with a StateInfo packet is acceptable. The packetization interval is only 30 milli seconds, thus, by losing one voice packet corresponding to such a small interval, the user will not perceive that a voice packet was lost.

A StateInfo packet is generated at both the Handset and base station since the compression of RTP voice packets is implemented on both of them. The Handset compresses the RTP voice packets it receives from the upper layer and the Base Station compresses the RTP voice packets it receives from the Internet via an Ethernet port.

When the first RTP voice packet is received by either of them, the UDP source port, destination port, RTP sequence number, RTP timestamp, RTP padding & SSRC are retrieved from the IP/UDP/RTP header, and the StateInfo packet with control message is formulated with all these fields. The full IP/UDP/RTP header is stored as a local copy for comparison with the successive RTP voice packets.

In the algorithm of the preferred embodiment, an acknowledgement (ACKStateInfo packet) is sent by the decompressor at the receiving end for every StateInfo packet that the compressor sends at the transmitting end. The compressor continues to send the StateInfo packets until a corresponding acknowledgment is received from the decompressor. A new message type is defined for the control message that carries StateInfo (control message Type=7). The format of the modified xMAC header and modified control Message that contains the ACK information is shown in FIGS. 12 and 13. The reader should compare the tables in these figures with the original xMAC header and original control message format shown in the Tables in FIGS. 7 and table 8.

The ACK Information will contain the 16-bit RTP sequence number of the StateInfo packet sent by the compressor. In case of packet loss, the compressor sends multiple StateInfo packets until it gets an ACK. The compressor uses the ACK Information (RTP sequence number) to identify which StateInfo packet this ACK belongs to. By receiving the ACK, the compressor will compare the ACK information received in ACKStateInfo against the RTP sequence number that was sent by it in StateInfo, which confirms that the decompressor has received the StateInfo packet successfully.

The compressedRTP packets are sent by the compressor only after it receives acknowledgment for the StateInfo packet it had sent to the decompressor. This will make sure that the packets are not wrongly decompressed at the other end of the link. The compressed packet carries 3 fields: RTP marker Bit, delta RTP Sequence Number, and delta scaled RTP timestamp. The packet format for the modified xMAC header and CompressedRTP packets are shown in FIGS. 14 and 15

A StateInfo packet is sent by the compressor at the transmitting end (either base station or handset) under the following conditions:

a) When the first RTP voice packet arrives at the compressor once the RTP session starts.

b) When either the RTP sequence number or RTP Time Stamp present in the RTP header of the voice packet wraps-around.

c) When the compressor does not receive the acknowledgement from the decompressor for the StateInfo packet it had previously sent. Every StateInfo packet sent by the compressor in downlink/uplink timeslot MUST be acknowledged with ACKStateInfo by the decompressor in the next uplink/downlink Timeslot. StateInfo packets will be sent continuously until the compressor receives an ACKStateInfo for the most recently sent StateInfo packet.

d) When a hand-off occurs, the state of compressor and decompressor at the handset will be reset, which will guarantee a StateInfo packet to be sent to the decompressor at the base station. Also, at the new base station, since the compressor and decompressor are initialized newly, a StateInfo packet is also sent from the new base station to the handset.

e) If, in the RTP session, any of the 3 (UDP source port, USP destination port or SSRC) fields in the RTP packet change, a StateInfo packet will be triggered by the compressor at the transmitting end.

An ACKStateInfo packet is sent by the decompressor to the compressor in the next uplink/downink slot for every StateInfo packet it receives in the downlink/uplink timeslot from the compressor.

A CompressedRTP packet is sent by the compressor when the compressor receives ACKStateInfo for the most recent StateInfo packet it had sent. Only then should the compressor start compressing RTP voice packets into CompressedRTP packets while transmitting to the decompressor at the other end.

Among these packets (StateInfo, ACKStateInfo and CompressedRTP), if there is more than 1 packet competing to get transmitted in a particular timeslot at the transmitting end, the order of preference for getting transmitted is:
i. ACKStateInfo
ii. StateInfo
iii. CompressedRTP The reason for giving ACKStateInfo the highest priority is this will allow compression of RTP packets to get started at least in one direction.

FIG. 16 is a comparison between cRTP [2] and the preferred embodiment of this disclosure.

Since certain changes may be made in the above described header compression method for a MAC protocol for use in VoIP systems that reduces packet overhead without departing from the scope of the invention herein involved. It is intended that all matter contained in the description thereof, or shown in the accompanying figures, shall be interpreted as illustrative and not in a limiting sense.

What is claimed is:

1. A header compression method for a medium access control protocol having voice traffic Internet Protocol packets containing voice information and uncompressed headers that contain fields that is used for sending Internet Protocol packets between a base station and one or more nodes in voice over Internet protocol systems on a wired or wireless network comprising:

first identifying said voice traffic Internet Protocol packets;

then eliminating said voice traffic Internet Protocol packets that are fragmented;

then categorizing said fields of said uncompressed headers of said identified and not eliminated voice traffic Internet Protocol packets as never transmitted categorized fields where said fields are constant, periodically transmitted categorized fields where said fields periodically change, or always transmitted categorized fields where said fields change with each of said identified voice traffic Internet Protocol packets;

then when a voice session starts and each time a change occurs in any of the periodically transmitted categorized fields during said voice session, said base station or said one or more nodes sending a control message containing a state-info packet indicating all information contained in some of said periodically transmitted categorized fields wherein said state-info packet always replaces said voice information each time said state-info packet is sent in said control message and said base station or said one or more nodes also sending information contained in the rest of said periodically transmitted categorized fields in unused fields of said voice traffic Internet Protocol packet headers and also in unused fields of said control message;

then said base station or said one or more nodes continuing to send said control message containing said state-info packet until said one or more nodes or said base station receives an acknowledge packet in reply; and, then said base station and said one or more nodes storing all information in said periodically transmitted categorized fields contained in said state-info packet, said voice traffic Internet Protocol packet headers, and said control message and then beginning compression on said uncompressed headers by said base station or said one or more nodes not transmitting said periodically transmitted categorized fields, never transmitting said never transmitted categorized fields, and always transmitting said always transmitted categorized fields in compressed headers along with voice traffic Internet Protocol packets and decompression on said compressed headers using said stored information and continuing compression on said uncompressed headers and decompression on said compressed headers even if a voice traffic Internet Protocol packet is lost or out of order until said voice session ends.

* * * * *